(No Model.) 2 Sheets—Sheet 2.

J. C. WINTERS.
METHOD OF AND APPARATUS FOR FILLING CANS AND PRESERVING THEIR CONTENTS.

No. 254,895. Patented Mar. 14, 1882.

WITNESSES
F. L. Ourand
D. P. Cowl

INVENTOR
John C. Winters,
by Wm. H. Pinckel
his Attorney.

N. PETERS, Photo-Lithographer, Washington, D. C.

UNITED STATES PATENT OFFICE.

JOHN C. WINTERS, OF MOUNT MORRIS, NEW YORK.

METHOD OF AND APPARATUS FOR FILLING CANS AND PRESERVING THEIR CONTENTS.

SPECIFICATION forming part of Letters Patent No. 254,895, dated March 14, 1882.

Application filed February 1, 1882. (No model.)

*To all whom it may concern:*

Be it known that I, JOHN C. WINTERS, a citizen of the United States, residing at Mount Morris, in the county of Livingston and State of New York, have invented a certain new and useful Method of and Apparatus for Filling Cans and Preserving their Contents; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to facilitate the canning or preserving of fruit, vegetables, meats, &c.; and the invention relates, first, to an improved method of supplying the fruit, &c., in the cans or jars with the requisite quantity of liquid; and, second, to means for this end.

The invention consists in passing the cans, jars, or other vessels containing the fruit or other materials, in accordance with the time required for what is technically known as "processing" the material, through a bath of the preserving-liquid kept at the required temperature for effecting the processing. This processing may be the application to the matter in the cans of a hot or cold liquid, sirup, or pickle, whereby the said matter may be cooked or partially cooked, or in condition for subsequent treatment, which may or may not be necessary, and sealing.

The invention consists, also, in an apparatus combining a tub or tank, guides or ways, and an endless revolving carrier with operating mechanism for such carrier, whereby fruits and other matter in cans, jars, or other receptacles prepared for preservation may be passed through a liquid or liquor in such tank in such regulated time as to effect the processing thereof.

Figure 1:
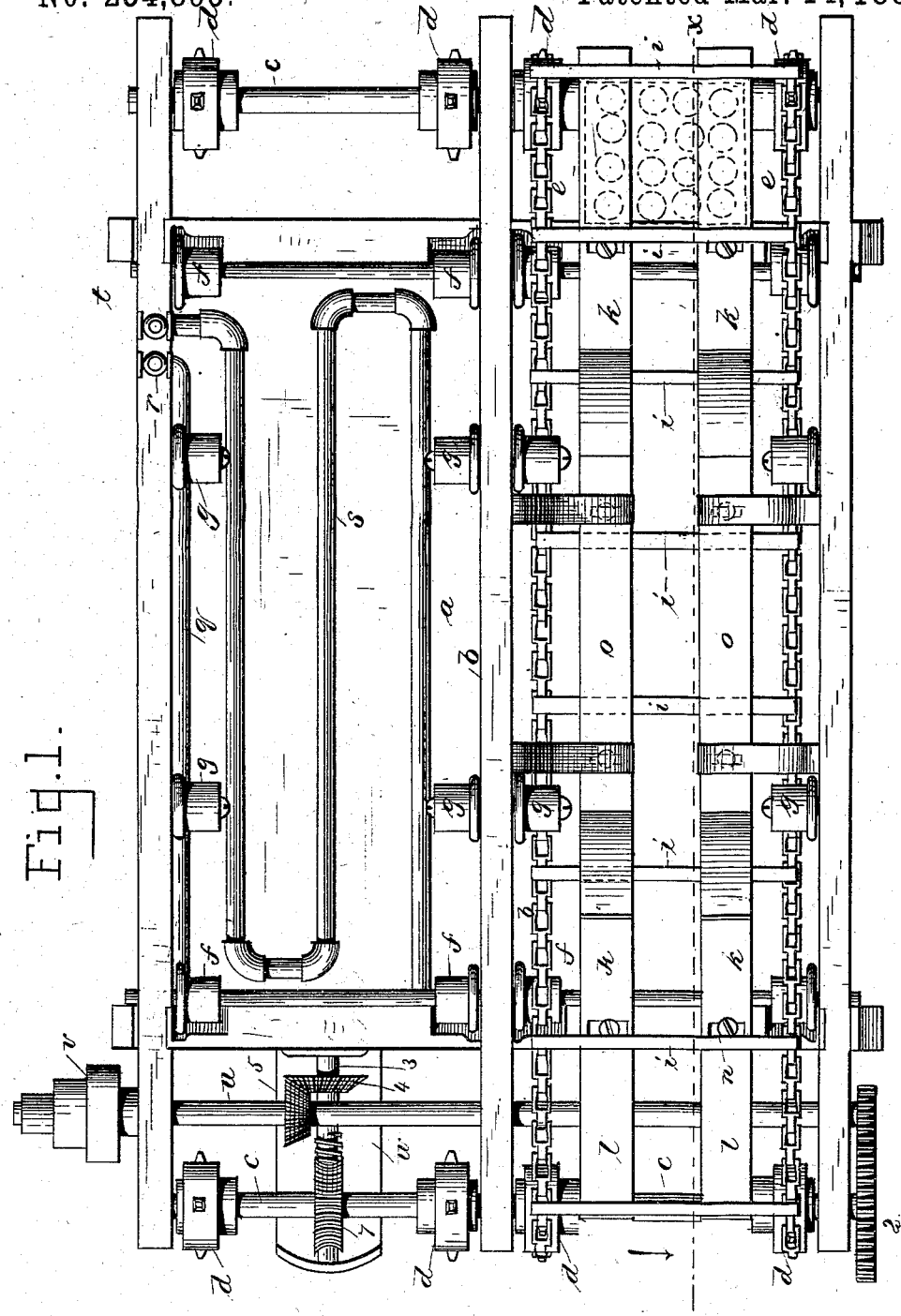
Figure 2:
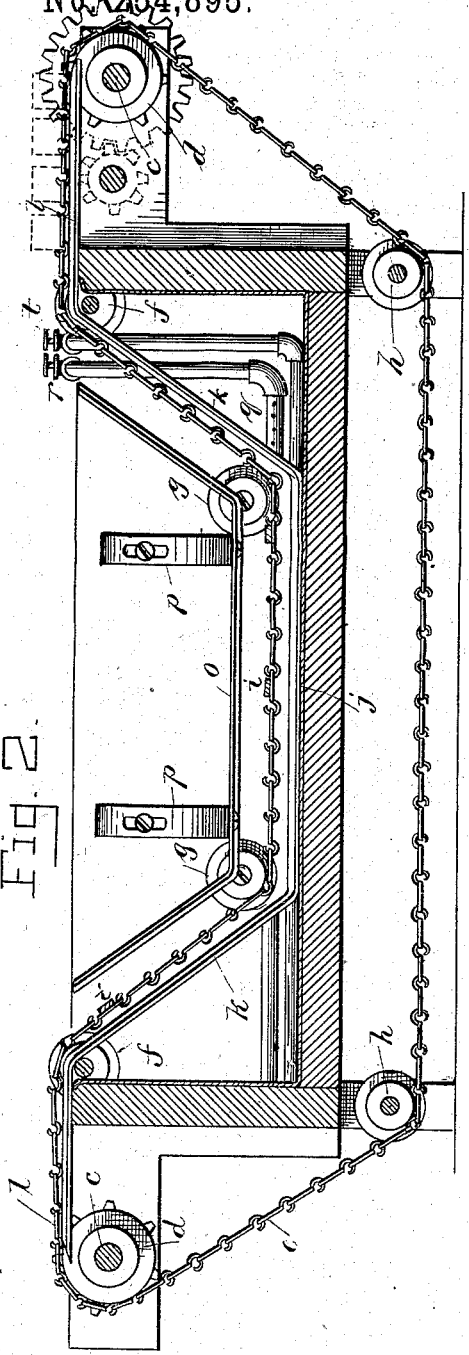
Figure 3:
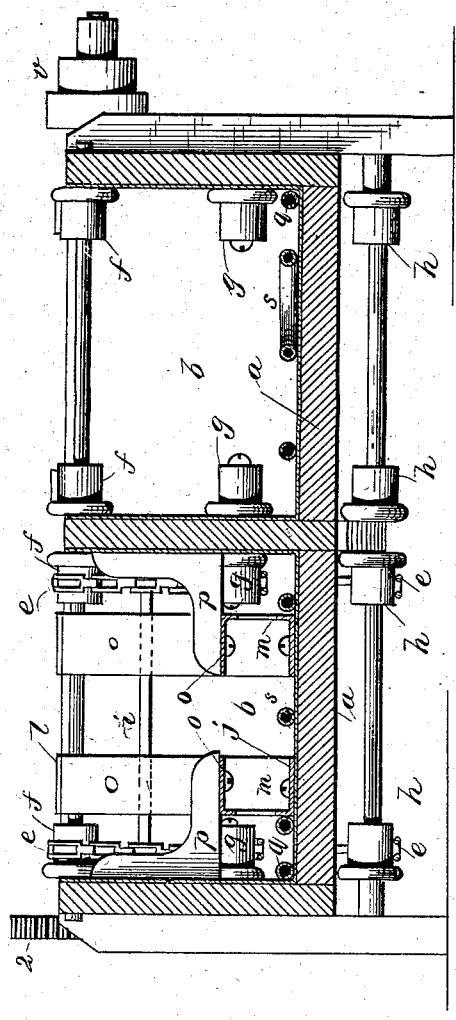

In the accompanying drawings, in the several figures of which like parts are similarly designated, Figure 1 is a top plan view of an apparatus in which my process may be practiced. Fig. 2 is a longitudinal section on the line $x\ x$ of Fig. 1, looking in the direction of the arrow; and Fig. 3 is a central cross-section of the same.

I have shown but one form of apparatus for practicing my invention of a method of filling cans and preserving their contents, and without limiting my said method to it I will proceed to describe in detail its construction. This apparatus is in the drawings shown as double, with parts omitted from one side in order to illustrate some of the details. A double apparatus is equivalent to one twice as long, and the converse of this is true; but the apparatus can be used double with an increased economy of length of operating room. I will simply describe one side of this apparatus, as each side (two or more being used) is a duplicate in every particular of the other.

$a$ is a liquid-tight tank, of wood or other material, with or without a non-oxidizable or non-corrosive lining, $b$, and supported upon suitable legs or in a framing.

$c\ c$ are rotary shafts at each end of the tank, supported in bearings connected with the tank-framing. These shafts are provided with sprocket-wheels $d\ d$, keyed or otherwise fast thereon—two at each end of the tank—which receive and move endless chain-belts $e\ e$. These belts extend longitudinally of and within the tank at opposite sides, and are supported at the ends thereof by guide rollers or pulleys $f\ f$, hung within the tank at its upper edge, whence said belts pass down into the tank and under other guide rollers or pulleys, $g\ g$, on pins near the bottom of the tank. Outside the tank these belts are guided and supported by pulleys or rollers $h\ h$, suitably mounted beneath the tank, so that said belts surround the tank longitudinally. They are connected at regulated intervals, according to the uses to which the apparatus is to be put, by cross-lags $i\ i$, so that the two chains with their lags, being moved together and synchronously, become practically one member; and I have herein designated this part of my apparatus the "carrier." As will be understood, the sprocket-wheels cause a positive movement of the carrier.

Upon the bottom of the tank, on opposite sides, are arranged parallel guides or ways $j\ j$, which may conveniently be made of wood or metal in ⌐ shape and of about the width of ordinary cans. These guides lie flat upon the bottom of the tank for the greater part of its length, then rise at each end at an incline, $k$, to the top of the tank, and then project beyond the tank to the end of the apparatus horizontally, $l$. The vertical flange $m$ of these guides is for the purpose of retaining the article in the carrier within the said guides, thus insuring its progress through the apparatus. The guides are adjustably secured to the tank by means of transverse slots $n$ and set-screws, whereby the distance between the parallel guides may be varied in accordance with the work to be done. The guides are arranged with their flanges $m$ next adjacent the sides of the tank. Similarly slotted and flanged guides $o$, having a horizontal central portion and upwardly-inclined ends, as with the guides $j$, are arranged over the guides $j$, their flanges projecting downwardly in the vertical plane of the flanges of the said guides $j$. These guides $o$ are suspended within the tank by brackets $p$, which are secured to the sides of the tank by set screws or bolts arranged in vertical slots in said brackets, so as to admit of the vertical adjustment of the guides $o$ to permit the treatment of cans, jars, &c., of different heights, as the slots in the guides admit of a varying proximity thereof to permit the treatment of cans of different diameters.

$q$ is a perforated pipe arranged within the tank, and having a cock, $r$, by means of which a regulated quantity of hot water or steam to heat the water in the tank may be supplied; and, inasmuch as the apparatus may be used alike for processing with water or sirup, I also provide an imperforate coiled pipe, $s$, with a cock, $t$, whereby steam-heat or hot water may be employed for heating the same. The coiled pipe will of course be a return-pipe, and the perforated pipe have a closed end within the tank.

Inasmuch as different fruits, vegetables, &c., require different lengths of time to complete their processing, it becomes necessary to provide a machine of this character with means for obtaining various speeds from fast to very slow. To this end I provide a driving-shaft, $u$, geared by large and small cog-wheels 1 2, respectively, with one of the shafts $c$, and provide it with a cone-pulley, $v$, to which the power may be applied for revolving the sprocket-wheels supporting the carrier. The cog-wheels 1 and 2 will be so attached to their respective shafts, as by gibs, keys, or set-screws, as to be interchangeable in order to vary the speed. In order to get the slowest speed, I may employ a bracket, $w$, in which is supported a counter-shaft, 3, which is connected by beveled gearing 4 5 with the driving-shaft $u$, from which it is revolved. This counter-shaft 3 has a worm, 6, which meshes with a worm-gear, 7, on the sprocket-wheel shaft $c$, whereby rotary motion is imparted to it.

In practicing my method of filling cans and preserving their contents by means of this apparatus, I use the projecting ends $l\,l$ of the guides $j\,j$ as a table, upon which, between adjacent lags of the carrier, I place a tray filled with cans. (See dotted lines, Figs. 1 and 2.) This tray fits in between the flanges of the lower guides when they are properly adjusted, and the upper guides are raised or lowered to such height as to permit the cans in the tray to just pass under them. The can-filled tray, held on the carrier by its lags, is then, by the revolving of the carrier, moved down between the proximate inclined ends of the guides into the bath in the tank. With some substances enough liquid can be got into the can through the vent-hole; with others the can top or cap will be left off. The cans obtain this liquid by reason of their being immersed in the liquid. That motion is given to the carrier which will afford the requisite length of time for the cans to be immersed in the liquid to effect their filling and the processing, cooking, or preserving of their contents; and the cans are kept in motion progressively through the bath and emerge at the opposite end of the machine, where they are removed with their tray from between the lags of the carrier, the cans being dry externally by reason of the well-known disinclination of hot liquid to remain in a free state upon metal, and the hot contents aiding thereto.

Any conveniently-manageable number of trays may be upon the carrier at a time, and thus the output of a packing establishment may be greatly increased.

While the most economical results may be accomplished by placing the cans in trays, still I can equally as well feed the cans through one by one, simply by arranging them to be moved by the carrier between the upper and lower guides.

What I claim is—

1. The method of filling cans and preserving their contents, the same consisting in mechanically passing such cans through the filling liquid at a rate of speed commensurate with the length of time required for the processing of their contents, substantially as described.

2. A water-tight tank, an endless carrier passing through such tank, and guides in said tank for the article carried by such carrier, combined substantially as shown and described.

3. A machine for filling cans and preserving their contents, the same consisting of a water-tight tank, an endless carrier traveling through said tank, means to move such carrier at a regulated speed, variable at pleasure, and guides through which the carrier moves in taking its burden through the apparatus, substantially as shown and described.

4. The water-tight tank, an endless carrier, adapted to travel therethrough, and adjustable guides, combined substantially as and for the purpose set forth.

5. The water-tight tank, endless belts adapted to travel therethrough, lags connecting said belts transversely to forward positively the article supported by said belts, and guides for retaining in the proper position the article carried by said belts, combined substantially as described.

6. The water-tight tank, the endless carrier, two sets of guides adjustable horizontally toward or from each other, one set of such guides being also adjustable vertically to vary the distance between the two sets, substantially as and for the purpose described.

7. A water-tight tank, heating apparatus within the same to keep its contents at a given temperature, an endless carrier, and guides, and means to operate said carrier to cause it to forward its burden in the path of the guides through the contents of said tank at a given uniform rate of speed, whereby fruit, vegetables, and other material in cans, jars, or other like receptacles may be supplied with the requisite quantity of liquid and preserved, substantially as described.

In testimony whereof I affix my signature in presence of two witnesses.

JOHN C. WINTERS.

Witnesses:
  J. M. HASTING,
  GEO. M. SHULL.